(12) United States Patent
Self et al.

(10) Patent No.: US 9,824,665 B2
(45) Date of Patent: Nov. 21, 2017

(54) METHOD, APPARATUS, AND COMPUTER PROGRAM PRODUCT FOR DYNAMICALLY DISPLAYING GRAPHICAL AND TEXTUAL OVERLAYS ON GEOSPATIAL ARRANGEMENTS

(71) Applicant: Change Healthcare LLC, Alpharetta, GA (US)

(72) Inventors: Bryan Self, Birmingham, AL (US); Brandon Wedgeworth, Alabaster, AL (US); Todd Morgan, Gardendale, AL (US)

(73) Assignee: Change Healthcare LLC, Alpharetta, GA (US)

( * ) Notice: Subject to any disclaimer, the term of this patent is extended or adjusted under 35 U.S.C. 154(b) by 569 days.

(21) Appl. No.: 13/943,217

(22) Filed: Jul. 16, 2013

(65) Prior Publication Data
US 2015/0022544 A1   Jan. 22, 2015

(51) Int. Cl.
| G06T 11/00 | (2006.01) |
| G09G 5/37 | (2006.01) |
| G06F 3/14 | (2006.01) |
| G06F 17/30 | (2006.01) |

(52) U.S. Cl.
CPC ........... *G09G 5/37* (2013.01); *G06F 3/14* (2013.01); *G06F 17/30* (2013.01); *G09G 2340/12* (2013.01); *G09G 2370/022* (2013.01); *G09G 2380/08* (2013.01)

(58) Field of Classification Search
CPC ........... G06F 17/2217; G06F 3/1454; G06F 17/2229; G06F 3/14; G06F 17/2205; G06F 17/30; G06F 21/10; G06F 3/0481; G06F 17/246; G06F 9/4443; G09G 2370/022; G09G 2340/14; G09G 2356/00; G09G 2370/042; G09G 2370/16; G09G 2380/08; G09G 2380/14; G09G 2340/10; G09G 5/393; G09G 5/37; G06T 11/206; G06T 11/20; G06T 15/503; G06T 11/001; G06T 11/60; G06T 19/00; G06T 11/00; H04L 41/22
USPC ........................................ 345/440, 592, 619
See application file for complete search history.

(56) References Cited

U.S. PATENT DOCUMENTS

| 2007/0094045 A1 | 4/2007 | Cobbs et al. |
| 2007/0094046 A1 | 4/2007 | Cobbs et al. |

OTHER PUBLICATIONS

U.S. Appl. No. 13/076,635, filed Mar. 31, 2011; First named inventor: Billy Callans.

*Primary Examiner* — Weiming He
(74) *Attorney, Agent, or Firm* — Alston & Bird LLP

(57) ABSTRACT

A method is provided for dynamically displaying graphical and textual overlays on geospatial arrangements. Glyph information provided by one or more third party systems may be stored in a centralized system. Upon request from a client terminal, the glyph information may be applied to a geospatial arrangement to generate an updated map to be displayed by the client terminal. Newly created glyphs, including new visual content, may be provided seamlessly after initial configuration.

20 Claims, 8 Drawing Sheets

FIG. 5A

| ID | Description | Optional |
|---|---|---|
| IDENT | Unique identifier | |
| URL | Icon resource url | |
| TYPE | SimpleIcon | labelIcon | goalIcon | ageIcon | |
| TARGET | room | patient | unit | |
| KEY | medical record number or room name | |
| TEXT | custom icon text | Yes |
| VISIBLE | glyph visibility which by default is true | Yes |
| GOALTIME | goalTime in millis for goalIcon | Yes |
| FADES | icon fades away, default false | Yes |
| SHOWTIME | absolute time in millis when icon appears | Yes |
| ENDTIME | endTime in millis for fading icons | Yes |

| ID | Description | Optional |
|---|---|---|
| IDENT | Unique identifier | |
| URL | Icon resource url | |
| UNIT | unit for glyph to display on | |
| X | float value of x coordinate, default 0.0 | Yes |
| Y | float value of y coordinate, default 0.0 | Yes |
| UNDERLAY | true if image lies under map | Yes |
| WIDTH | long value of image width | Yes |
| HEIGHT | long value of image height | Yes |
| OPACITY | float image opacity from 0.0 to 1.0 | Yes |
| VISIBLE | glyph visibility which by default is true | Yes |
| FADES | icon fades away, default false | Yes |
| SHOWTIME | absolute time in millis when icon appears | Yes |
| ENDTIME | endTime in millis for fading icons | Yes |
| ONCLICK | name of function for click event | Yes |
| ECMAURL | url of ECMA script defining onClick function | Yes |

| ID | Description | Optional |
|---|---|---|
| IDENT | Unique identifier | |
| UNIT | Unit for glyph to display on | |
| TEXT | text to display | |
| X | float value of x coordinate, default 0.0 | Yes |
| Y | float value of y coordinate, default 0.0 | Yes |
| UNDERLAY | true if image lies under map | Yes |
| OPACITY | float image opacity from 0.0 to 1.0 | Yes |
| VISIBLE | glyph visibility which by default is true | Yes |
| FADES | icon fades away, default false | Yes |
| ENDTIME | endTime in millis for fading icons | Yes |
| FONTSIZE | font size | Yes |
| FONTFAMILY | font family | Yes |
| FONTCOLOR | font color | Yes |

– 550
– 552
– 554

METHOD, APPARATUS, AND COMPUTER PROGRAM PRODUCT FOR DYNAMICALLY DISPLAYING GRAPHICAL AND TEXTUAL OVERLAYS ON GEOSPATIAL ARRANGEMENTS

TECHNOLOGICAL FIELD

Embodiments of the present invention relate generally to computer technology and, more particularly, to methods, apparatuses, and computer program products for dynamically displaying graphical and textual overlays on geospatial arrangements.

BACKGROUND

The widespread use of modern computing technology and improvements in visual media has led to an increasing demand for visual representations of data. The healthcare industry, among others, is one that utilizes geospatial arrangements to convey information in a visual format, efficiently and effectively to various units and individuals, such as throughout a hospital, for example. Doctors and staff may view a floor plan of patient rooms for a particular floor of a hospital to manage workflows and attend to patients. Patients and other individuals may reference a geospatial arrangement of a hospital layout to locate a cafeteria, public restrooms, or other amenities.

BRIEF SUMMARY OF SOME EXAMPLE EMBODIMENTS

Methods, apparatuses, and computer program products are therefore provided for dynamically displaying graphical and textual overlays on geospatial arrangements. According to example embodiments, geospatial arrangements (e.g., maps) may be updated with glyphs (e.g., images and/or text) to reflect patient statuses as well as provide alerts and other information specific to a patient, room, unit, and/or other location represented on a map. Medical facilities in particular may benefit from instant or near-instant updates to maps providing pertinent information. Example embodiments also provide for customization of such glyphs independent from initial integration of a geospatial system with the hospital's infrastructure, even after deployment.

A method is provided, including receiving glyph information from a third party system, storing the glyph information in association with a geospatial arrangement, receiving a request for the geospatial arrangement from a client, generating, with a processor, an updated geospatial arrangement based on the glyph information, and causing the updated geospatial arrangement to be displayed by the clients. In some embodiments, the glyph information is stored remotely from the third party system, and the third party system is remote from the client. The glyph information may comprise location information relative to the geospatial arrangement, and content information comprising at least one of a uniform resource locator (URL) or text.

In some embodiments, the request for the geospatial arrangement is received via a repeated polling request from the client, and causing the updated geospatial arrangement to be displayed by the client comprises causing a previous display to be changed based on the glyph information. The geospatial arrangement may include a floor plan of a medical facility, and the glyph information may include location information identifying at least one of a patient, room, or unit.

In some embodiments, the glyph information may include location information identifying coordinates on the geospatial arrangement. The glyph information may include at least one of a) a display time, b) a display duration, c) a level of opacity, d) identification of an onclick event, or e) font information.

A computer program product is also provided, including at least one non-transitory computer-readable medium having computer-readable program instructions stored therein, the computer-readable program instructions comprising instructions, which when performed by an apparatus, are configured to cause the apparatus to at least receive glyph information from a third party system, store the glyph information in association with a geospatial arrangement, receive a request for the geospatial arrangement from a client, generate an updated geospatial arrangement based on the glyph information, and cause the updated geospatial arrangement to be displayed by the client.

The glyph information may be stored remotely from the third party system, and the third party system is remote from the client. The glyph information may comprise location information relative to the geospatial arrangement, and content information comprising at least one of a uniform resource locator (URL) or text. The request for the geospatial arrangement may be received via a repeated polling request from the client, and the instructions configured to cause the updated geospatial arrangement to be displayed by the client comprise instructions configured to cause a previous display to be changed based on the glyph information. The geospatial arrangement may include a floor plan of a medical facility, and the glyph information comprises location information identifying at least one of a patient, room, or unit. The glyph information may include location information identifying coordinates on the geospatial arrangement.

An apparatus is provided, including processing circuitry configured to communicate with a third party system and client, said processing circuitry configured to cause the apparatus to at least receive glyph information from the third party system, store the glyph information in association with a geospatial arrangement, receive a request for the geospatial arrangement from the client, generate an updated geospatial arrangement based on the glyph information, and cause the updated geospatial arrangement to be displayed by the client.

The glyph information may be stored remotely from the third party system, and the third party system is remote from the client. The glyph information may include location information relative to the geospatial arrangement, and content information comprising at least one of a uniform resource locator (URL) or text. The request for the geospatial arrangement may be received via a repeated polling request from the client, and the processing circuitry is configured to cause the updated geospatial arrangement to be displayed by the client by causing a previous display to be changed based on the glyph information.

The geospatial arrangement may include a floor plan of a medical facility, and the glyph information comprises location information identifying at least one of a patient, room, or unit. The glyph information may include location information identifying coordinates on the geospatial arrangement.

A system for managing the display of glyphs is also provided, the system including a) a server configured to receive glyph information from a third party system, store the glyph information in association with a geospatial arrangement, receive a request for the geospatial arrangement from a client, generate an updated geospatial arrangement based on the glyph information, and cause the updated geospatial arrangement to be displayed by the client, and b) the third party system configured to provide glyph information to the server, asynchronously from the request for the geospatial arrangement from the client.

An apparatus is also provided, including means for receiving glyph information from the third party system, storing the glyph information in association with a geospatial arrangement, receiving a request for the geospatial arrangement from the client, generating an updated geospatial arrangement based on the glyph information, and causing the updated geospatial arrangement to be displayed by the client.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE SEVERAL VIEWS OF THE DRAWINGS

Figure 1:
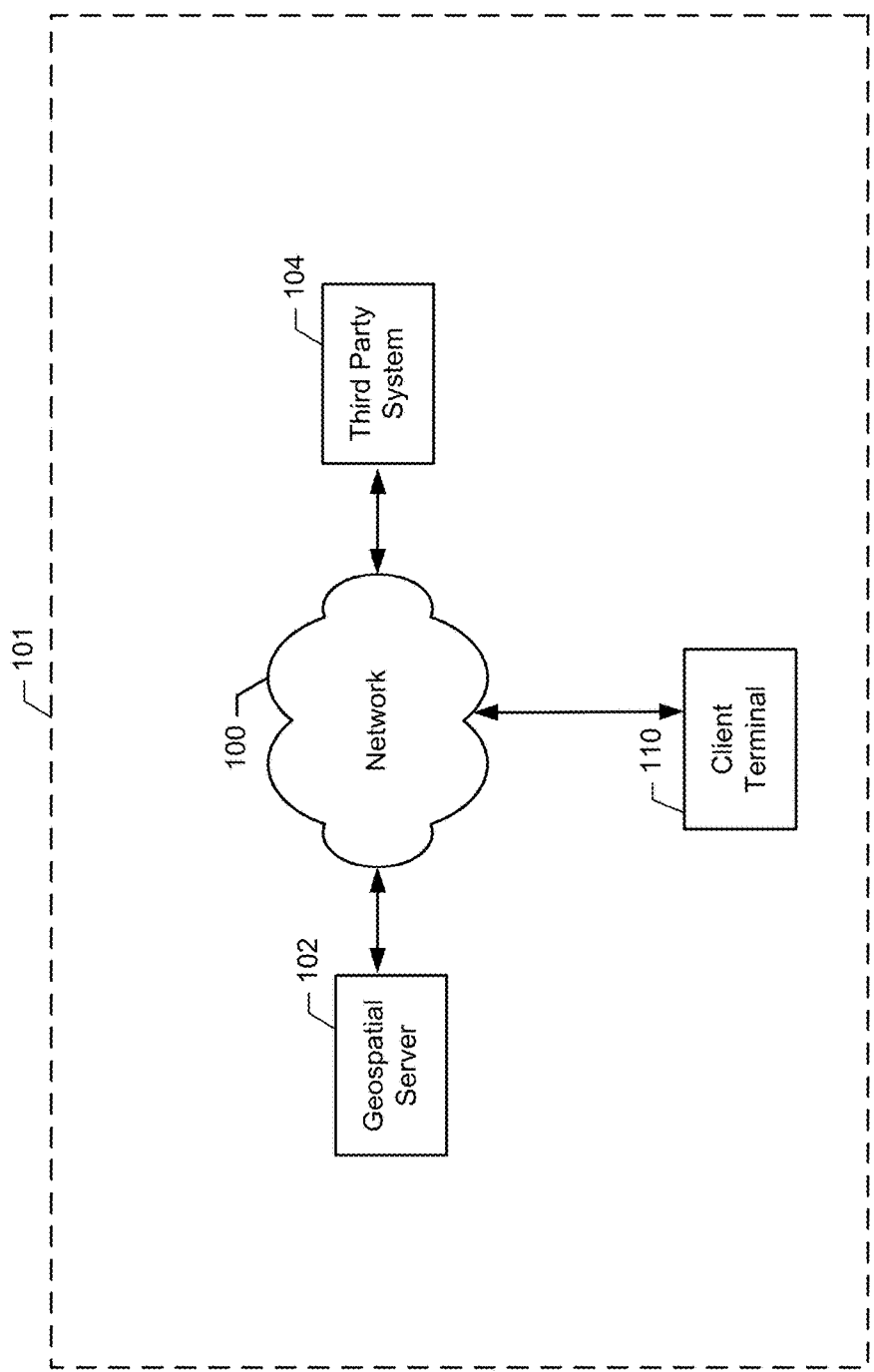
Figure 2:
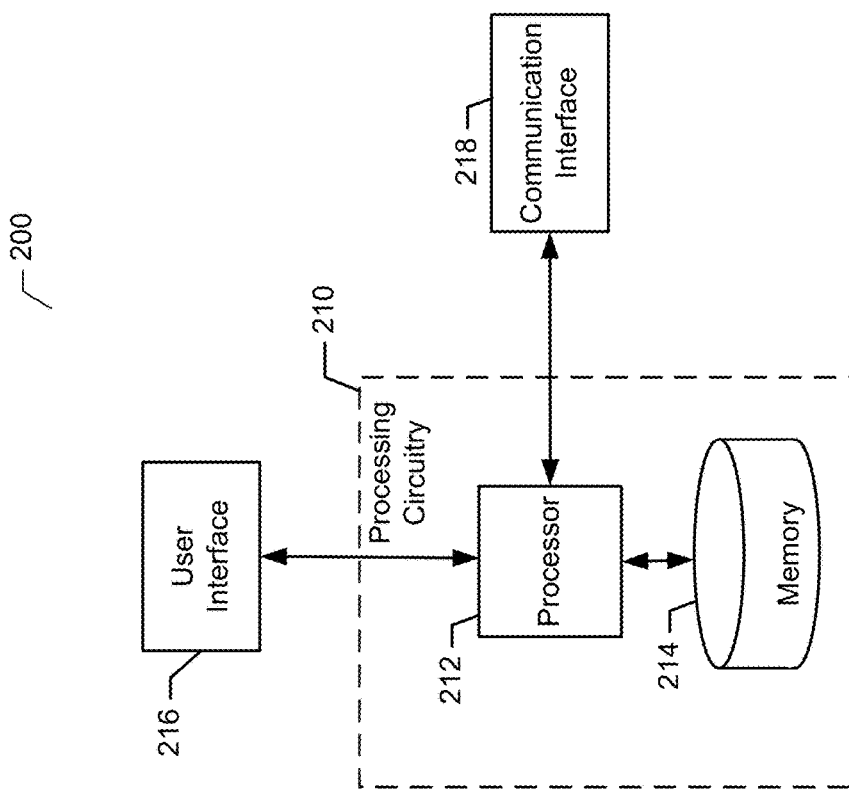
Figure 3:
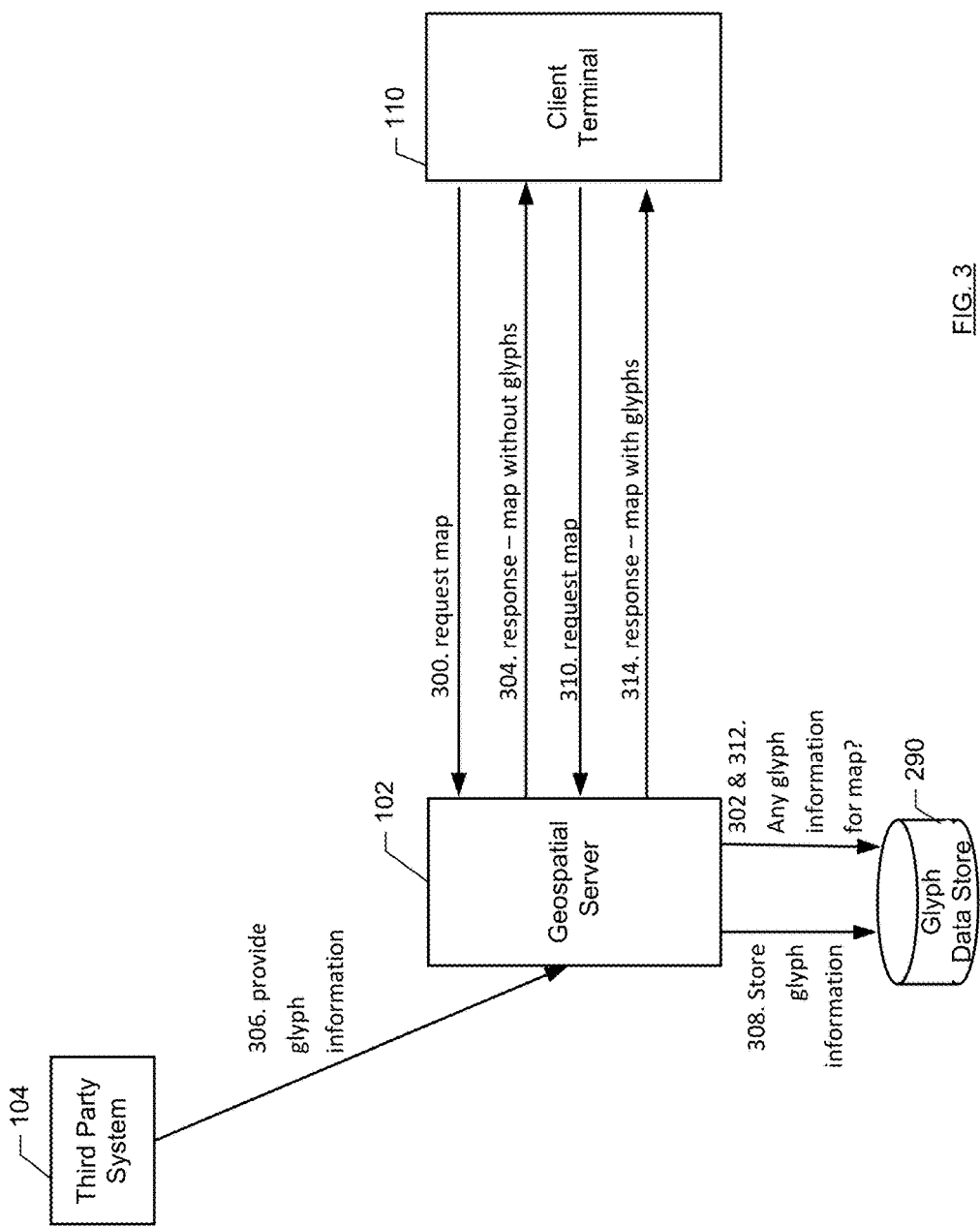
Figure 4:
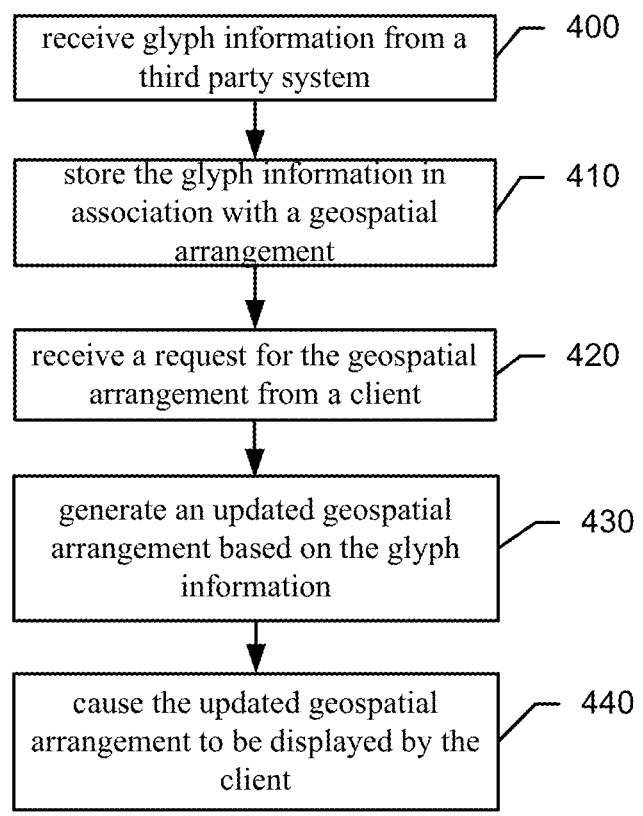
Figure 6:
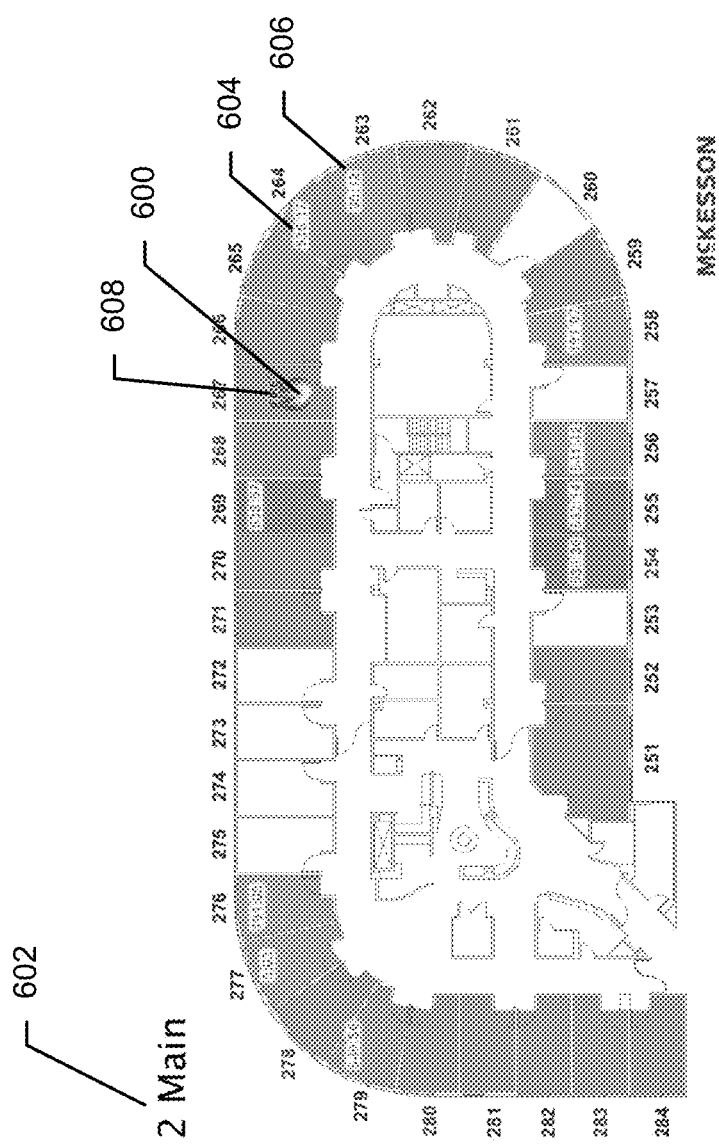
Figure 7:
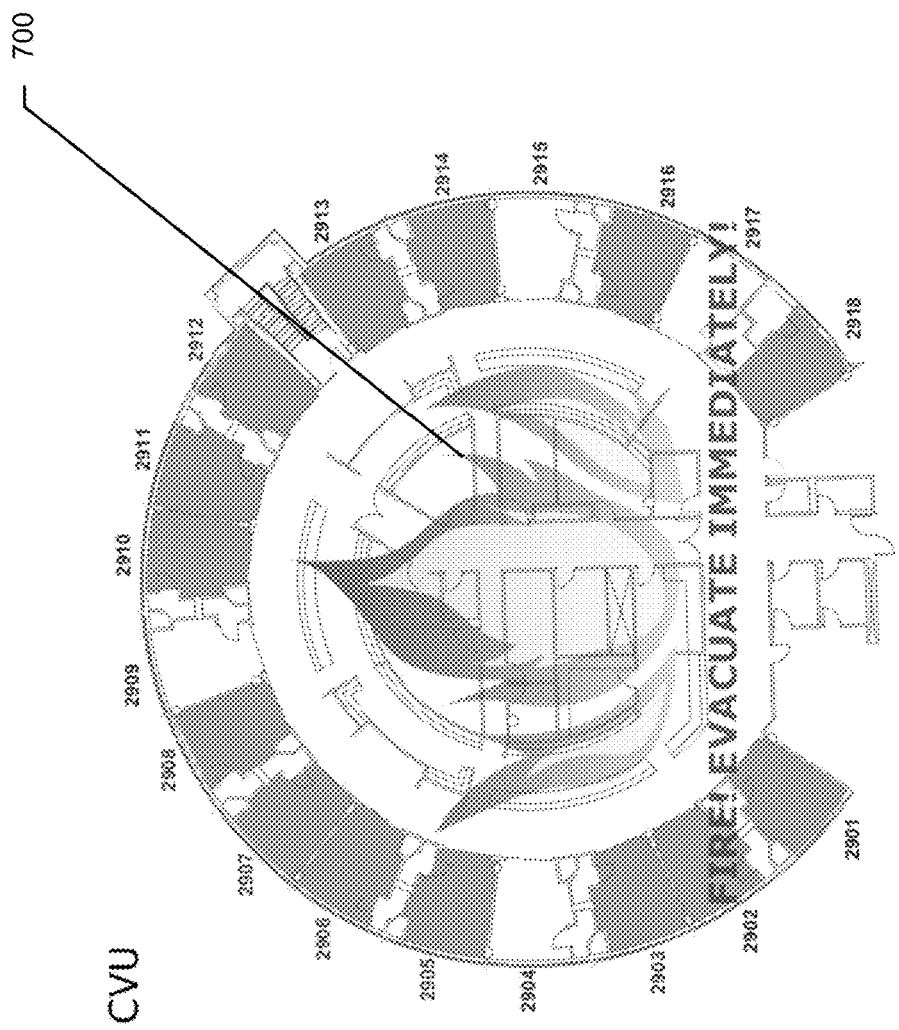
Figure 8:
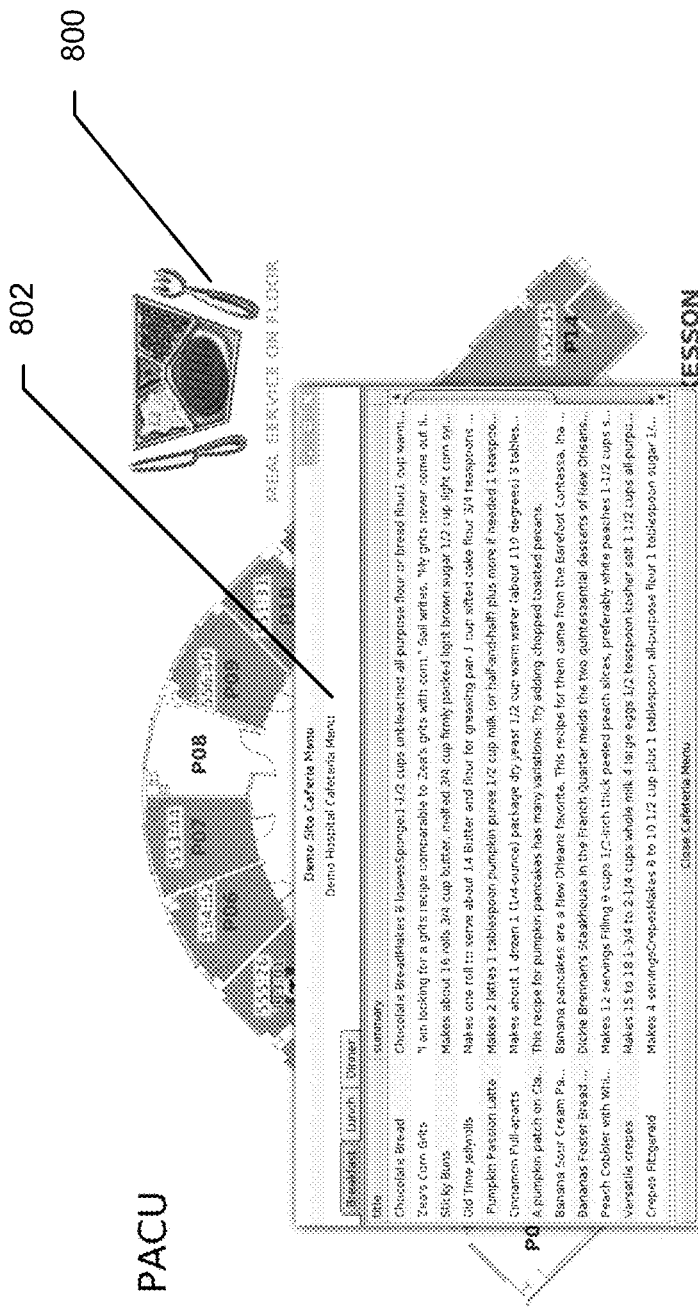

Having thus described embodiments of the invention in general terms, reference will now be made to the accompanying drawings, which are not necessarily drawn to scale, and wherein:

FIG. 1 illustrates a system for dynamically displaying glyphs on a geospatial arrangement, according to some example embodiments;

FIG. 2 is a block diagram of an apparatus used in the display of glyphs on a geospatial arrangement, according to some example embodiments;

FIG. 3 is a block diagram illustrating operations according to some example embodiments;

FIG. 4 is a flowchart illustrating operations according to some example embodiments;

FIGS. 5A, 5B, and 5C are example Application Programming Interfaces (APIs) according to some example embodiments; and FIGS. 6-8 are example geospatial arrangements, according to some example embodiments.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, where a computing device is described herein to receive data from another computing device, it will be appreciated that the data may be received directly from the other computing device and/or may be received indirectly via one or more intermediary computing devices, such as, for example, one or more servers, relays, routers, network access points, and/or the like. Similarly, where a computing device is described herein to transmit data to other computing device, it will be appreciated that the data may be sent directly to the other computing device or may be sent to the other computing device via one or more interlinking computing devices, such as, for example, one or more servers, relays, routers, network access points, and/or the like.

FIG. 1 illustrates a system 101 for dynamically displaying glyphs on a geospatial arrangement according to some example embodiments. It will be appreciated that the system 101, as well as the illustrations in other figures, are each provided as an example of an embodiment(s) and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system, numerous other configurations may also be used to implement embodiments of the present invention.

The system 101 may include a network 100, geospatial server 102, third party system 104, and/or a client, such as a client terminal 110. In some example embodiments, geospatial server 102 may be embodied as or comprise one or more computing devices. In some example embodiments, geospatial server 102 may be implemented as a distributed system or a cloud based entity that may be implemented within network 100. In this regard, geospatial server 102 may comprise one or more servers, a server cluster, one or more network nodes, a cloud computing infrastructure, some combination thereof, or the like.

Geospatial server 102 may be configured to maintain geospatial arrangements and provide the arrangements for display by a client terminal 110. A geospatial arrangement may be considered the organization of data or information relative to a map or map-type view of a particular area, and may comprise underlying data defining locations, relative to a two or three dimensional map. As such, and for the sake of simplicity, a geospatial arrangement may be referred to herein as a map. According to the example embodiments provided herein, geospatial server 102 may be further configured to receive glyph information, from third party system 104, for example, apply the glyph information to a map, and provide the updated map to client terminal 110. Maps may be provided to client terminal 110 via a web application, for example. In this regard, geospatial server 102 may additionally or alternatively be implemented as a web server.

The third party system 104 may therefore be configured to communicate with geospatial server 102 over network 100, for example. Third party system 104 may be embodied as or comprise one or more computing devices. In some example embodiments, third party system 104 may be implemented as a distributed system or a cloud based entity that may be implemented within network 100. In this regard, third party system 104 may comprise one or more servers, a server cluster, one or more network nodes, a cloud computing infrastructure, some combination thereof, or the like In example embodiments provided herein, the third party system 104 may be operative to perform one or more functions associated with the infrastructure of a medical facility (e.g., hospital). For example, a third party system 104 may be used to systematically manage any information such as patient statuses, physician shift schedules, and/or nurse assignments, among others. Although a hospital is used throughout as an example embodiment, it will be appreciated that the embodiments provided herein may be beneficial to many other fields and uses. The hospital environment is cited as a non-limiting example, and should not be construed to narrow the scope or spirit of the disclosure in any way. Additionally, the term 'third party' may be used to emphasize that the system 104 may operate independently from geospatial server 102 and/or under different ownership than that of the geospatial server 102, but it will be appreciated that in some embodiments, the third party system 104 may indeed be operated, separately, but nonetheless by the same entity in control of the geospatial server 102.

Although FIG. 1 depicts one third party system 104, in some embodiments, any number of third party systems 104 may be present. In example embodiments provided herein, third party system 104 may be configured to provide glyph information to geospatial server 102 (which may be implemented remotely from third party system 102), so that information gathered by the third party system 104 may be represented in a visual format on a geospatial arrangement.

Client terminal 110 may be embodied as a user terminal such as a laptop computer, tablet computer, mobile phone, desktop computer, workstation, or other like computing device. A client terminal 110 may be remote from the geospatial server 102 and/or third party system 104, in which case the user terminal 110 may communicate with any of the respective apparatuses via network 100. Additionally or alternatively, a client terminal 110 may be implemented on a third party system 104. User terminal(s) 110 may be used to access an application, e.g., a web application, such as a map provided by the geospatial server 102. As such, in example embodiments, physicians, staff, patients and/or other individuals may use client terminal 110 to view maps and related pertinent information provided by geospatial server 102. Communication between client terminal 110 and geospatial server 102 may occur via network 100, and the client terminal 110 may request and receive data from the geospatial server 102 in such a manner that the geospatial server operates as a blackbox server. Processing of the geospatial arrangements may be performed by the geospatial server 102, deeming the client terminal 110, in some embodiments, a thin client. Any number of client terminals 110 may be present in system 101.

Network 100 may be embodied in a local area network, the Internet, any other form of a network, or in any combination thereof, including proprietary private and semi-private networks and public networks. The network 100 may comprise a wired network, wireless network (e.g., a cellular network, wireless local area network, wireless wide area network, some combination thereof, or the like), or a combination thereof, and in some example embodiments comprises at least a portion of the Internet.

FIG. 2 illustrates an example apparatus 200 that may implement geospatial server 102, third party system 104, and/or client terminal 110, in accordance with some example embodiments. However, it should be noted that the components, devices, and elements illustrated in and described with respect to FIG. 2 below may not be mandatory and thus some may be omitted in certain embodiments. For example, FIG. 2 illustrates a user interface 216, as described in more detail below, which may be provided by the client terminal 110, but may be optional in the geospatial server 102 and/or third party system 104. Additionally, some embodiments may include further or different components, devices, or elements beyond those illustrated in and described with respect to FIG. 2.

Continuing with FIG. 2, processing circuitry 210 may be configured to perform actions in accordance with one or more example embodiments disclosed herein. In this regard, the processing circuitry 210 may be configured to perform and/or control performance of one or more functionalities of geo spatial server 102, third party system 104, and/or client terminal 110 in accordance with various example embodiments. The processing circuitry 210 may be configured to perform data processing, application execution, and/or other processing and management services according to one or more example embodiments. In some embodiments, geospatial server 102, third party system 104, and/or client terminal 110, or a portion(s) or component(s) thereof, such as the processing circuitry 210, may be embodied as or comprise a circuit chip. The circuit chip may constitute means for performing one or more operations for providing the functionalities described herein.

In some example embodiments, the processing circuitry 210 may include a processor 212, and in some embodiments, such as that illustrated in FIG. 2, may further include memory 214. The processing circuitry 210 may be in communication with or otherwise control a user interface 216, and/or a communication interface 218. As such, the processing circuitry 210 may be embodied as a circuit chip (e.g., an integrated circuit chip) configured (e.g., with hardware, software, or a combination of hardware and software) to perform operations described herein.

The processor 212 may be embodied in a number of different ways. For example, the processor 212 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 212 may comprise a plurality of processors. The plurality of processors may be in operative communication with each other and may be collectively configured to perform one or more functionalities of geospatial server 102, third party system 104, and/or client terminal 110 as described herein. The plurality of processors may be embodied on a single computing device or distributed across a plurality of computing devices collectively configured to function as geospatial server 102, third party system 104, and/or client terminal 110. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA, or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the memory 214 may include one or more non-transitory memory devices such as, for example, volatile and/or non-volatile memory that may be either fixed or removable. In this regard, the memory 214 may comprise a non-transitory computer-readable storage medium. It will be appreciated that while the memory 214 is illustrated as a single memory, the memory 214 may comprise a plurality of memories. The plurality of memories may be embodied on a single computing device or may be distributed across a plurality of computing devices collectively configured to function as geospatial server 102, third party system 104, and/or client terminal 110. The memory 214 may be configured to store information, data, applications, instructions and/or the like for enabling geospatial server 102, third party system 104, and/or client terminal 110 to carry out various functions in accordance with one or more example embodiments. For example, the memory 214 may be configured to buffer input data for processing by the processor 212. Additionally or alternatively, the memory 214 may be configured to store instructions for execution by the processor 212. As yet another alternative, the memory 214 may include one or more databases that may store a variety of files, contents, or data sets. For example, when apparatus 200 is implemented as geospatial server 102, the memory 214 may be configured to store glyph information and/or maps. Among the contents of the memory 214, applications may be stored for execution by the processor 212 to carry out the functionality associated with each respective application. In some cases, the memory 214 may be in communication with one or more of the processor 212, user interface 216, and/or communication interface 218, for passing information among components of geospatial server 102, third party system 104, and/or client terminal 110.

The user interface 216 may be in communication with the processing circuitry 210 to receive an indication of a user input at the user interface 216 and/or to provide an audible, visual, mechanical, or other output to the user. As such, the user interface 216 may include, for example, a keyboard, a mouse, a joystick, a display, a touch screen display, a microphone, a speaker, and/or other input/output mechanisms. As such, the user interface 216 may, in some example embodiments, provide means for user control of managing or processing data access operations and/or the like. In some example embodiments in which geospatial server 102 and/or third party system 104 is embodied as a server, cloud computing system, or the like, aspects of user interface 216 may be limited or the user interface 216 may not be present. Accordingly, regardless of implementation, the user interface 216 may provide input and output means in accordance with one or more example embodiments, such as displaying a geospatial arrangement.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210. By way of example, the communication interface 218 may be configured to enable communication among geospatial server 102, third party system 104, and/or client terminal 110 via network 100. Accordingly, the communication interface 218 may, for example, include supporting hardware and/or software for enabling wireless and/or wireline communications via cable, digital subscriber line (DSL), universal serial bus (USB), Ethernet, or other methods.

FIG. 3 is a block diagram according to an example embodiment, also illustrating operations according to an example embodiment. Geospatial server 102, third party system 104, and a client, such as client terminal 110, as described above are shown in yet another example embodiment, so as to illustrate the communications between geospatial server 102, third party system 104, and client terminal 110. Additionally, glyph data store 290 is provided, which may be implemented as a database, remote from geospatial server 102 and/or on memory 214. In some embodiments, geospatial server 102 may transmit and/or retrieve glyph information to and/or from glyph data store 290 (such as over network 100 and/or a LAN).

As shown by operation 300, client terminal 110 may request a map for a particular area or floor of a hospital for display on the client terminal 110. The request may be transmitted using Hyper Text Transfer Protocol (HTTP), for example, and/or another protocol, and may include a parameter and/or other indication identifying the map to be displayed. The request made at operation 300, as well as the one made at operation 310 (described below) may be made as a part of a polling process from client terminal 110 to geospatial server 102. As such, the client terminal 110 may be configured to continually display a particular map, and may poll geospatial server 102 on a repeated time interval such as thirty seconds, for example, to ensure the most recent data available is illustrated on the map. A client terminal 110, such as one configured to display time critical information, such as high level vital signs of particular patients, may poll geospatial server 102 on a more frequent basis.

Geospatial server 102 may then receive the request from client terminal 110, such as by communication interface 218, and process the request as follows. The geospatial server 102 may identify, such as with processor 212 and memory 214, the stored map being requested by the client terminal 110. The geospatial server 102, at operation 302 may then query glyph data store 290 for glyph information associated with the map. As an example, in this scenario, the geospatial server 102 determines that there is no glyph information in glyph database 290 for the requested map. As such, at operation 304, the geospatial server 102 responds to the client terminal 110 by providing the map, without any glyph information. The map may be transmitted as an HTTP response via communication interface 218 and over network 100, for example. The client terminal 110 may then display the received map on a display and for viewing by individuals at the hospital.

Independently from operations 300, 302, and 304, third party system 104 may provide glyph information to the geospatial server 102, as shown by operation 306. The glyph information may include information identifying an associated map, location information relative to the map (e.g., an indication of where on the map the specified glyph should be displayed), and/or content information (e.g., reference to, or visual content that is the glyph itself) comprising at least one of an identifier, such as an address, e.g., a uniform resource locator (URL), (which references the content), or text (that is the content). The glyph information provided at operation 306 may be transmitted over network 100, via communication interface 218, such as by HTTP RST (representational state transfer) or other protocol, for example. In some embodiments, the glyph information may be provided manually, such as by a user accessing a URL and providing the information as parameters to the URL. In some embodiments, the glyph information may be provided systematically by an application running on the third party system 104. Glyph information is described in further detail with respect to FIGS. 5A-5C.

As shown by operation 308, the glyph information may be received by the geospatial server 102, and stored to glyph database 290. The glyph information may be stored in association with a map such that in subsequent retrievals, geospatial server 102 may apply a glyph to the appropriate map.

As described above, the requests from the client terminal 110 may occur via a polling process, such as every thirty seconds. As such, a subsequent request at operation 310 may be made from the client terminal 110 to the geospatial server 102, as in operation 300. However, this time, when geospatial server 102 queries glyph database 290, as shown by operation 312, the recently received glyph information (provided by third party system 104 in operation 306 above), is identified and retrieved. Geospatial server 102 may then apply the glyph information to the requested map, and transmit the updated map (e.g., with the glyph(s)) to client terminal 110, as shown at operation 314. The response provided at operation 314 may be similar to the response provided at operation 304, but may vary in that the map, as displayed by client terminal 110, will now display the recently provided glyph, according to the information provided by third party system 104.

FIG. 4 is a flowchart illustrating example operations of geospatial server 102 according to an example embodiment. As shown by operation 400, geospatial server 102 may include means, such as communication interface 218, to receive glyph information from a third party system (e.g., third party system 104). The information may be received in response to third party system 104 providing the glyph information such as in operation 306, described above.

As shown by operation 410, and as described with respect to operation 308 above, geospatial server 102 may include means, such as memory 214, for storing the glyph information in association with a geospatial arrangement (e.g., map). In an example embodiment, to associate the glyph information with a geospatial arrangement, geospatial server 102 may use a linking unique identifier.

Continuing to operation 420, geospatial server 102 may include means, such as communication interface 218, for receiving a request for the geospatial arrangement from a client, such as client terminal 110. The request may be comparable to those received at operations 300, and/or 310, above, and as such may be received as polling requests made using HTTP or other protocol, for example.

As shown by operation 430, geospatial server 102 may include means, such as processor 212, for generating an updated geospatial arrangement based on the glyph information. The geospatial arrangement may be updated by accessing a geospatial arrangement, processing the glyph information, and applying the glyph such that the glyph appears on the geospatial arrangement in a location specified by the glyph information. In some embodiments, updating the geospatial arrangement may include removing a previously displayed glyph.

As shown by operation 440, geospatial server 102 may include means, such as communication interface 218, and/or user interface 216, to cause the updated geospatial arrangement to be displayed by the client. In some embodiments, this may include transmitting the updated geospatial arrangement to the client (e.g., client terminal 110), such as described with respect to operations 304 and/or 314 above. Example updated geospatial arrangements are provided in FIGS. 6-8, described below.

FIGS. 5A, 5B, and 5C are example APIs (application programming interfaces) which may be used by third party system 104 to provide glyph information to geospatial server 102. In some embodiments, different types of glyphs may be available. FIG. 5A provides an example API for an icon, FIG. 5B provides an example API for an overlay image, and FIG. 5C provides an example API for overlay text. The three types of glyphs may include different glyph information.

As shown in row 500 of FIG. 5A, the glyph information may include a unique identifier so that the glyph information may be stored uniquely in memory, such as memory 214 and/or glyph database 290. The identifier may also be needed for subsequent updates to and/or removal of an associated glyph by third party system 104. As shown by row 502, glyph information may include a URL referencing content that is the visual component of the glyph itself. The URL may include or otherwise point or refer to an image or media that will be displayed on the map. As shown by row 504, an icon glyph may include a type of simple icon, label icon, goal icon, and/or age icon. An example simple icon 600, indicating a fire alarm was triggered, is provided in FIG. 6. An example label icon 602 is also provided. A goal icon may comprise a timer (e.g., a goal time until a meal is served), such as shown by indicator 604 of FIG. 6. An age icon may track an amount of time that has passed since initiation (e.g., an amount of time a patient has been in surgery), such as shown by indicator 606 of FIG. 6. Areas (e.g., individual rooms) of the map may be color coded so as to provide indication of the event type associated with a goal icon and/or age icon. The goal icon and/or age icon may present any unit of time such as days, hours, and/or minutes.

Continuing with the example API of FIG. 5A, as shown by rows 506 and 508, the glyph information provided by third party system 104 and maintained by the geospatial server 102 may include a target parameter or type, and corresponding key. In particular, a glyph may be attached to, for example, a room, patient and/or unit. A fire symbol, for example, may be most likely associated with a room, while a surgery icon may be associated with a particular patient. Attaching a glyph to a patient may ensure that if a third party system (which may or may not be different from the third party system providing the glyph information) provides information indicating the patient has been moved from the patient's room to an operating room, the glyph moves along with the patient. As shown in row 508, a key may include an identifier of the target, such as a medical record number to identify a patient, or room name and/or number to identify a room.

In the example API of FIG. 5A, the parameters on rows 510-520 may be optional. On row 510, a text parameter may provide for labeling of a glyph, such as shown by text 608 of FIG. 6. The parameter of row 512 may be a Boolean indication of whether or not the glyph should be made visible, allowing hiding and displaying of a glyph (as opposed to deleting and providing the glyph information repeatedly). The third party system 104 may therefore show and hide a glyph, allowing for reuse.

The goal time parameter on row 514 may be used for glyphs of type goal icon in order to provide an estimated time in the future an event will occur. Geospatial server 102 may therefore update the timer shown upon each refresh of a display on the client terminal 110, based on the goal time. As shown on row 516 a Boolean parameter enabling a fade away may be provided. As shown by rows 518 and 520 respectively, third party system 104 may provide a show time (e.g., start time) to display a glyph, and an end time for the glyph to be removed from a display.

Continuing to the example API of FIG. 5B, some parameters of the glyph overlay image may be similar to those of the glyph icon API of FIG. 5A. Additionally or alternatively, the API of a glyph overlay image may include a unit, such as shown by row 522. The unit may be provided as location information in order to display a glyph over a large portion of a map, such as the glyph 700 of FIG. 7, indicating a fire is detected and the entire unit should evacuate.

In some embodiments, the glyph information may include x and/or y coordinates, shown on rows 524 and 526, respectively. In instances in which third party system 104 provides x and/or y coordinates, the glyph may be displayed precisely on those coordinates of the map. Specifying x and/or y coordinates may be particularly beneficial in displaying labels and/or headings such as shown by indicator 602 of FIG. 6.

The underlay Boolean parameter of row 528 provides for displaying the glyph underneath the map instead of overlaying the glyph. Width and height parameters, on rows 530 and 532 may allow for adjustment of the size of the glyph. The opacity parameter on row 534 may provide for adjusting the opacity and/or making the glyph see-through so that some of the map may be visible. This may be beneficial in instances in which smaller icon glyphs are displayed beneath a larger overlay image.

Continuing to rows 536 and 538 of FIG. 5B, the glyph information for an overlay image may include an 'onclick' event and Ecma URL, respectively. The onclick parameter may comprise a name of a function triggered by a selection of the glyph, while the Ecma URL may define the script location for the onclick event. FIG. 8 provides a glyph 800 that may be configured with the onclick and Ecma URL parameters to display the overlay text 802 (described below) upon selection of the glyph 800. Ecma scripts are provided as an example and it will be appreciated that other script types may be used.

FIG. 5C provides an example API for a glyph including overlay text. Some parameters of the overlay text API are the same or similar as parameters provided and described with respect to FIGS. 5A and/or 5B. Additionally or alternatively, the glyph information for overlay text may include a font size, font family, and font color, as shown by rows 550, 552 and 554, respectively. The font parameters may allow third party system 104 to set the font provided in a text overlay. An example text overlay 802 is provided in FIG. 8.

As described above, embodiments described herein provide for dynamic display of glyphs on geospatial arrangements. Maps may be configured such that third party system 104 may provide new content, even after initial setup of a map, and display the content dynamically as a glyph on any unit, room, patient, and/or other location represented on the map. The process by which third party system 104 provides the glyph information to geospatial server 102 eliminates the need for geospatial server 102 to request the information from third party system 104 repeatedly, as it is requested from client terminal 110. Said differently, communication of glyph information from third party system 104 to geospatial server 102 may occur asynchronously from the communications between client terminal 110 and geospatial server 102 that result in the display of the maps and corresponding glyphs. As such, third party system 104 may dedicate its resources to other essential processes central to its function, and rely on the geospatial server 102 to manage the glyph information and apply the glyphs to the maps, as described above, in response to requests made by client terminal 110.

Some embodiments in particular allow for improved efficiency of request processing. Consider an embodiment with several third party systems 104, each of which could potentially provide updates to a map displayed by client terminal 110. Instead of a geospatial server 102 calling each and every third party system 104 to check for updates, the glyph information from all third party systems 104 may be made available to the geospatial server 102 on memory 214, glyph database 290, and/or the like. If more than one third party system 104 attempts to display a glyph on the same location (e.g., room) on a map, geospatial server 102 may rotate and/or alternate display of the glyphs accordingly. Additionally or alternatively, geospatial server 102 may reference a hierarchy to determine which glyph should be displayed.

FIGS. 3 and 4 illustrate operations of a method, apparatus, and computer program product according to some example embodiments. It will be understood that each operation of the flowcharts or diagrams, and combinations of operations in the flowcharts or diagrams, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, memory 214) storing instructions executable by a processor in the computing device (for example, by processor 212). In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, geospatial server 102, third party system 104, and/or client terminal 110) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, geospatial server 102, third party system 104, client terminal 110, and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   responding to a request for a geospatial arrangement from a client by providing the geospatial arrangement to the client;
   in response to the request, causing the geospatial arrangement to be displayed by the client prior to a receipt of glyph information associated with the geospatial arrangement from a third party system;
   independently from the request from the client for the geospatial arrangement and prior to a subsequent request for the geospatial arrangement from the client, receiving the glyph information from the third party system, wherein the glyph information comprises information identifying the geospatial arrangement as associated with the glyph information, location information relative to the geospatial arrangement, and content information defining a visual component;
   storing the glyph information in association with the geospatial arrangement;
   receiving the subsequent request for the geospatial arrangement from the client, wherein the receipt of the glyph information from the third party system occurs independently from the receipt of the subsequent request for the geospatial arrangement from the client;
   in response to the subsequent request, generating, with a processor, an updated geospatial arrangement based on the glyph information; and
   causing the updated geospatial arrangement to be displayed by the client.

2. A method according to claim 1, wherein the glyph information is stored remotely from the third party system, and the third party system is remote from the client.

3. A method according to claim 1, wherein the glyph information comprises
   a) location information relative to the geospatial arrangement, and
   b) content information comprising at least one of a uniform resource locator (URL) or text.

4. A method according to claim 1, wherein
   the request and the subsequent request for the geospatial arrangement are received via a repeated polling request from the client and
   causing the updated geospatial arrangement to be displayed by the client comprises causing a previous display to be changed based on the glyph information.

5. A method according to claim 1, wherein
   the geospatial arrangement comprises a floor plan of a medical facility, and
   the glyph information comprises location information identifying at least one of a patient, room, or unit.

6. A method according to claim 1, wherein the glyph information comprises location information identifying coordinates on the geospatial arrangement.

7. A method according to claim 1, wherein the glyph information received from the third party independently from the receipt of the request for the geospatial arrangement comprises at least one of a) a display time, b) a display duration, c) a level of opacity, d) identification of an onclick event, or e) font information.

8. The method of claim 1, wherein the glyph information is received from the third party system without requesting the glyph information from the third party system.

9. A computer program product comprising at least one non-transitory computer-readable medium having computer-readable program instructions stored therein, the computer-readable program instructions comprising instructions, which when performed by an apparatus, are configured to cause the apparatus to at least:
   respond to a request for a geospatial arrangement from a client by providing the geospatial arrangement to the client;
   in response to the request, causing the geospatial arrangement to be displayed by the client prior to a receipt of glyph information associated with the geospatial arrangement from a third party system;
   independently from the request from the client for the geospatial arrangement and prior to a subsequent request for the geospatial arrangement from the client, receive the glyph information from the third party system, wherein the glyph information comprises information identifying the geospatial arrangement as associated with the glyph information, location information relative to the geospatial arrangement, and content information defining a visual component;
   store the glyph information in association with the geospatial arrangement;
   receive the subsequent request for the geospatial arrangement from the client;
   in response to the subsequent request, generate an updated geospatial arrangement based on the glyph information; and
   cause the updated geospatial arrangement to be displayed by the client.

10. The computer program product of claim 9, wherein the glyph information comprises:
    a) location information relative to the geospatial arrangement, and
    b) content information comprising at least one of a uniform resource locator (URL) or text.

11. The computer program product of claim 9, wherein
    the request and subsequent request for the geospatial arrangement are received via a repeated polling request from the client, and
    the instructions configured to cause the updated geospatial arrangement to be displayed by the client comprise instructions configured to cause a previous display to be changed based on the glyph information.

12. The computer program product of claim 9, wherein
    the geospatial arrangement comprises a floor plan of a medical facility, and
    the glyph information comprises location information identifying at least one of a patient, room, or unit.

13. The computer program product of claim 9, wherein the glyph information comprises location information identifying coordinates on the geospatial arrangement.

14. An apparatus comprising processing circuitry configured to communicate with a third party system and client, said processing circuitry configured to cause the apparatus to at least:

respond to a request for a geospatial arrangement from the client by providing the geospatial arrangement to the client;

in response to the request, cause the geospatial arrangement to be displayed by the client prior to a receipt of glyph information associated with the geospatial arrangement from the third party system;

independently from the request from the client for the geospatial arrangement and prior to a subsequent request for the geospatial arrangement from the client, receive the glyph information from the third party system, wherein the glyph information comprises information identifying the geospatial arrangement as associated with the glyph information, location information relative to the geospatial arrangement, and content information defining a visual component;

store the glyph information in association with the geospatial arrangement;

receive the subsequent request for the geospatial arrangement from the client;

in response to the subsequent request, generate an updated geospatial arrangement based on the glyph information; and cause the updated geospatial arrangement to be displayed by the client.

15. The apparatus of claim 14, wherein the glyph information is stored remotely from the third party system, and the third party system is remote from the client.

16. The apparatus of claim 14, wherein the glyph information comprises:
   a) location information relative to the geospatial arrangement, and
   b) content information comprising at least one of a uniform resource locator (URL) or text.

17. The apparatus of claim 14, wherein
the request and the subsequent request for the geospatial arrangement are received via a repeated polling request from the client, and
the processing circuitry is configured to cause the updated geospatial arrangement to be displayed by the client by causing a previous display to be changed based on the glyph information.

18. The apparatus of claim 14, wherein
the geospatial arrangement comprises a floor plan of a medical facility, and
the glyph information comprises location information identifying at least one of a patient, room, or unit.

19. The apparatus of claim 14, wherein the glyph information comprises location information identifying coordinates on the geospatial arrangement.

20. A system for managing the display of glyphs, the system comprising:
   a) a server configured to:
      respond to a request for a geospatial arrangement from a client by providing the geospatial arrangement to the client;
      in response to the request, cause the geospatial arrangement to be displayed by the client prior to a receipt of glyph information associated with the geospatial arrangement from a third party system;
      independently from the request from the client for the geospatial arrangement and prior to a subsequent request for the geospatial arrangement from the client, receive the glyph information from the third party system, wherein the glyph information comprises information identifying the geospatial arrangement as associated with the glyph information, location information relative to the geospatial arrangement, and content information defining a visual component;
      store the glyph information in association with the geospatial arrangement;
      receive the subsequent request for the geospatial arrangement from the client;
      in response to the subsequent request, generate an updated geospatial arrangement based on the glyph information; and
      cause the updated geospatial arrangement to be displayed by the client; and
   b) the third party system configured to:
      provide the glyph information to the server, independently from the request for the geospatial arrangement from the client.

* * * * *